Dec. 14, 1965　　F. G. CLARK　　3,222,959
MAGNETIC DRIVING TOOL OR IMPLEMENT
Filed Feb. 6, 1964
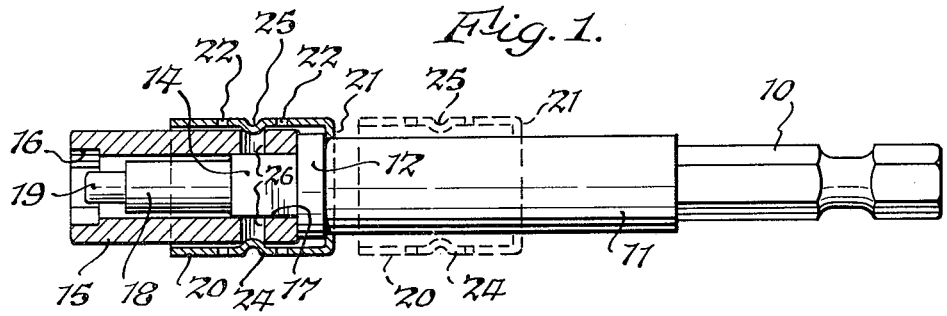
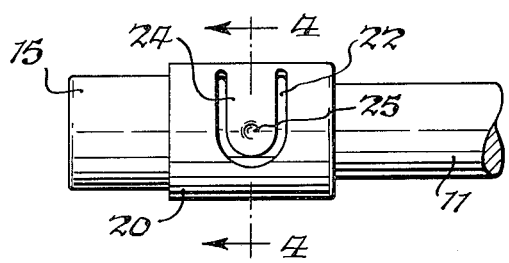
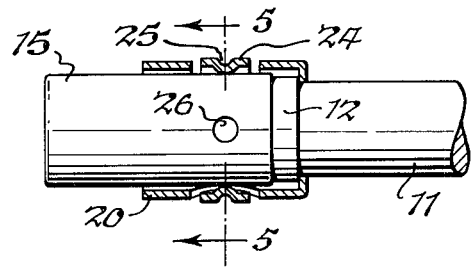
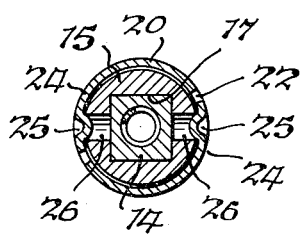
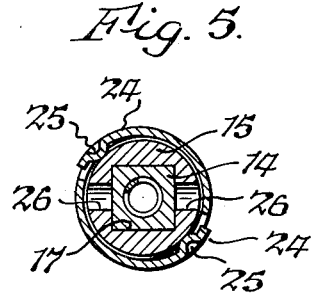
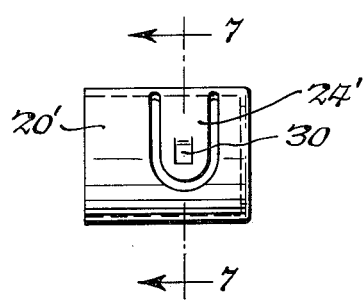
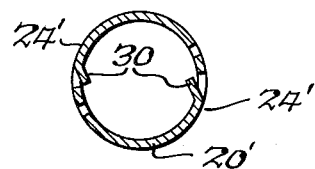

United States Patent Office 3,222,959
Patented Dec. 14, 1965

3,222,959
MAGNETIC DRIVING TOOL OR IMPLEMENT
Frederick G. Clark, Buffalo, N.Y., assignor of one-half to Wade Stevenson, Buffalo, N.Y.
Filed Feb. 6, 1964, Ser. No. 342,994
3 Claims. (Cl. 81—177)

This invention relates to improvements in driving implements for rotating fastenings, such as nuts, bolts, screws and the like, and more particularly to implements of this type provided with permanent magnets for holding the fastenings in operative position on the implement while the fastenings are being positioned for driving.

Implements of this type may be provided with sockets into which the heads of fastenings fit while being driven, and such sockets must be changed to enable the driving implement to cooperate with fastenings of different sizes or shapes.

One of the objects of this invention is to provide implements of this type with holding sleeves or collars provided with means operable manually for rapidly disconnecting the collar from a socket and securing it to another socket, without the use of any tool for this purpose.

It is also an object of this invention to provide means for mounting sockets on implements of this kind without any change or alteration in the standard sockets.

Another object is to provide a collar of this type having a cylindrical portion which extends about a part of the socket and which is provided with spring fingers having parts formed to engage parts of the sockets for releasably holding them in operative position on the implement.

In the accompanying drawings:

FIG. 1 is a longitudinal view of a driving implement with a portion thereof shown in section to illustrate the holding collar and driving socket embodying my invention.

FIG. 2 is a fragmentary view showing the fastening-engaging end of the tool or implement with the parts in their operative or locking positions.

FIG. 3 is a fragmentary view taken at approximately 90 degrees from that shown in FIG. 1 and showing the holding collar out of locking position.

FIGS. 4 and 5 are transverse, sectional views thereof on lines 4—4, FIG. 2 and 5—5 FIG. 3, respectively.

FIG. 6 is an elevation of a holding collar of slightly modified construction.

FIG. 7 is a transverse section thereof on line 7—7, FIG. 6.

The driving implement includes a shank 10 of any usual or suitable construction, that shown being of a type commonly used in connection with a power-driven screwdriver or similar implement. This shank has the inner end portion thereof of hexagonal or other non-circular cross section for forming a driving connection with a rotatable part of a power-actuated implement. It will be understood that this shank may be of other suitable or desired construction and, for example, may be a part of a hand-driven implement for imparting rotation to a fastener, the shank shown also including a substantially cylindrical portion 11 which terminates at its outer end in an upwardly extending shoulder portion 12. The shank beyond the shoulder portion has a projecting part or stud 14 of square or other non-circular cross section which serves to transmit torque from the shank to a socket 15, which is of hollow, tubular form, and the outer end of which is provided with a recessed portion 16 which is formed to receive the head of the fastening to be driven. The opposite or inner end of the socket 15 is provided with a recessed portion 17 of square or other non-circular cross section which is so formed that the stud 14 of the shank may fit into this recessed portion, thus forming a driving connection for transmitting torque from the shank and socket to a fastening device such as may be fitted into the recessed portion 16 of the socket. The inner end of the socket bears against the shoulder 12 to oppose any pressure exerted by the implement to the socket and the fastening device to be driven thereby.

The magnet holding the fasteners in the socket is contained in a holder 18 having a tip or end portion 19 extending forwardly from the holder. These parts do not of themselves form a part of this invention and may be constructed and arranged as shown in my Patent #2,677,294 of May 4, 1954.

It is necessary to provide means for releasably connecting the socket with the driving member of the implement and for this purpose I have provided a collar 20 of cylindrical form which extends about the socket, and this collar is provided at its inner end with an inwardly extending, annular flange 21 which engages the side of the shoulder 12 which is opposite to that engaged by the socket 15. The cylindrical part of the collar is provided with means for releasably attaching it to the socket, and in the construction shown for this purpose the cylindrical portion of the socket is provided at opposite sides thereof with slots 22 of approximately U-shape. These slots form a pair of fingers 24 integrally connected at one end with the cylindrical back portion of the collar 20. These fingers 24 are provided with means for engaging the socket to hold the same in place. For example, in the construction shown in FIGS. 1–5, each finger is provided with a detent or inwardly extending, indented part or projection 25 formed to fit into a recess or depression in the socket.

Sockets employed with implements of this type are usually provided with a hole 26 extending diametrically through the same. I have arranged the detents or projections 25 of the fingers so as to fit into the ends of this hole. Other recessed parts may be provided on the socket for receiving the projections 25 of the collar but since the holes 26 are provided in standard sockets, I prefer to use them to hold the sockets in place. Consequently, when the parts are in the positions shown in FIGS. 1, 2 and 4, the projections 25 of a collar will extend into the ends of the hole 26 and thus releasably hold the socket on the driving member. When it is desired to disconnect the socket from the driving member, it is merely necessary to move the collar manually, either lengthwise toward the inner end of the driving member or circumferentially, to move the depressions 25 out of the ends of the holes 26, whereupon the socket can readily be removed from its operative position and replaced by another socket with corresponding recessed parts. The fingers 24 in which the indented parts 25 are formed are integral parts of the collar and consequently form a releasable connection between the socket and the shoulder 12, which hold the socket against the shoulder and with the non-circular, recessed part in engagement with the stud 14.

In the modified construction shown in FIGS. 6 and 7, I have provided the fingers 24' of the collar 20' with inwardly extending detents or projections in the form of teeth 30. These projections are formed to enter into the ends of the hole 26 in the socket or into any other recess in the socket. Any other means on the collar for entering into engagement with a recessed part of the socket may be provided.

The invention shown and described has the advantage that the collar can be readily connected or disconnected by hand with the socket either by relative movement of these two parts lengthwise or circumferentially. The construction also can be easily and conveniently manufactured and its operation is in no way interfered with by the magnet and has the further advantage that the collar can cooperate with standard sockets without requiring any change therein.

It will be understood that various changes in the details, materials and arrangements of parts, which have been herein described and illustrated in order to explain the nature of the invention, may be made by those skilled in the art, within the principle and scope of the invention as expressed in the appended claims.

I claim:
1. A tool for driving screw-threaded fastenings, said tool including a shank,
   a socket removably supported on the outer end of said shank for cooperating with fastenings to be driven and having a hole extending through the same,
   a shoulder formed on said shank and against one face of which said socket may abut,
   a collar of cylindrical form having an inwardly extending flange on one end thereof engaging the other face of said shoulder,
   said collar extending about said socket,
   fingers on the cylindrical part of said collar extending circumferentially thereof and having inwardly extending projections thereon cooperating with the opposite ends of said hole in said socket for holding said socket in operative position on said tool.

2. A tool according to claim 1 in which the cylindrical portion of said collar has U-shaped slots formed therein extending circumferentially of said collar and which define said fingers.

3. A tool according to claim 1 in which said hole in said socket extends diametrically thereof with the ends of said hole being arranged at 180 degrees from each other and constituting depressions into which said inwardly extending projections of said collar extend, said projections also being spaced at 180 degrees from each other.

References Cited by the Examiner
UNITED STATES PATENTS

| | | | |
|---|---|---|---|
| 2,086,261 | 7/1937 | Douglass | 81—52.3 |
| 2,490,478 | 12/1949 | Schaedler | 279—19.6 |
| 2,677,294 | 5/1954 | Clark | 81—125 |

WILLIAM FELDMAN, *Primary Examiner.*

MILTON S. MEHR, *Examiner.*